US010531604B2

(12) United States Patent
Van Mill et al.

(10) Patent No.: US 10,531,604 B2
(45) Date of Patent: Jan. 14, 2020

(54) TOOLBAR SYSTEM FOR AN AGRICULTURAL IMPLEMENT

(71) Applicant: Unverferth Manufacturing Company, Inc., Kalida, OH (US)

(72) Inventors: Michael D. Van Mill, Shell Rock, IA (US); Ryan J. Fleshner, Allison, IA (US); Ronald J. Schlimgen, Shell Rock, IA (US)

(73) Assignee: Unverferth Manufacturing Company, Inc., Kalida, OH (US)

( * ) Notice: Subject to any disclaimer, the term of this patent is extended or adjusted under 35 U.S.C. 154(b) by 0 days.

(21) Appl. No.: 15/809,495

(22) Filed: Nov. 10, 2017

(65) Prior Publication Data

US 2018/0146611 A1     May 31, 2018

Related U.S. Application Data

(63) Continuation of application No. 14/612,849, filed on Feb. 3, 2015, now Pat. No. 9,839,175.

(60) Provisional application No. 62/040,857, filed on Aug. 22, 2014.

(51) Int. Cl.
    *A01B 73/06*     (2006.01)
    *A01B 73/04*     (2006.01)
    *A01C 23/00*     (2006.01)

(52) U.S. Cl.
    CPC .......... *A01B 73/067* (2013.01); *A01B 73/046* (2013.01); *A01C 23/008* (2013.01)

(58) Field of Classification Search
    CPC .............................. A01B 73/067; A01B 73/046

USPC ........................................................ 172/311
See application file for complete search history.

(56) References Cited

U.S. PATENT DOCUMENTS

| 4,344,572 A | 8/1982 | Tyler |
| 5,291,954 A * | 3/1994 | Kirwan ................ A01B 73/065 172/273 |
| 5,346,019 A | 9/1994 | Kinzenbaw et al. |
| 5,887,390 A | 3/1999 | Schulz |

(Continued)

OTHER PUBLICATIONS

Thurston Manufacturing Company, Press Release "BLU-JET Introduces 90' Liquid Applicator", Sep. 2, 2008, 2 pages.

(Continued)

*Primary Examiner* — Thomas B Will
*Assistant Examiner* — Joel F. Mitchell
(74) *Attorney, Agent, or Firm* — Rothwell, Figg, Ernst & Manbeck, P.C.

(57) ABSTRACT

An agricultural implement includes a toolbar system having a toolbar frame, an elevator assembly, and a first wing on one side of the toolbar frame. The first wing may be coupled to the elevator and pivotable about a first vertical axis of rotation between an extended and a folded position. Tools may be coupled to the first wing and rotatable relative to a longitudinal axis of the first wing from an operating position below the first wing to a transport/shipping position above the first wing. Further, the first wing may be adapted to be moveable to position the first wing higher than a wheel of the agricultural implement on the same side of the toolbar frame in the folded position. Subsequently, the tools may be circularly rotated and the middle wing and tools pushed down to reduce the overall width and height of the implement for transporting or shipping.

25 Claims, 14 Drawing Sheets

(56) References Cited

U.S. PATENT DOCUMENTS

| | | | |
|---|---|---|---|
| 6,675,907 B2* | 1/2004 | Moser et al. | A01B 63/32 |
| | | | 111/121 |
| 7,429,003 B2* | 9/2008 | Thompson et al. | |
| | | | A01M 7/0075 |
| | | | 172/311 |
| 7,740,084 B2 | 6/2010 | Rosenboom | |
| 8,342,257 B2 | 1/2013 | Rosenboom | |
| 8,464,967 B2* | 6/2013 | Kuphal et al. | B05B 1/20 |
| | | | 172/459 |
| 8,528,657 B1 | 9/2013 | Rosenboom | |
| 8,763,716 B2 | 7/2014 | Rosenboom | |
| 9,844,173 B2* | 12/2017 | Fast et al. | A01B 73/067 |
| 2010/0201186 A1 | 8/2010 | Rosenboom | |
| 2013/0126196 A1 | 5/2013 | Rosenboom | |
| 2013/0240223 A1 | 9/2013 | Rosenboom | |
| 2014/0034341 A1 | 2/2014 | Fast | |
| 2014/0262563 A1 | 9/2014 | Rosenboom | |

OTHER PUBLICATIONS

Thurston Manufacturing Company, BLU-JET, "AT7000, Assembly and Operators Manual," All Terrain Liquid Fertilizer Injection Toolbar, Manual No. 0607090, Oct. 8, 2009, pp. 1-104.
Thurston Manufacturing Company, BLU-JET, "AT7000, Assembly and Operators Manual," All Terrain Liquid Fertilizer Injection Toolbar, Manual No. 0607090, Oct. 8, 2009, pp. 105-192.
Brochure for Farm King Liquid Fertilizer Application Equipment, Copyright 2013, 16 pages.
Schaben Industries, AG Spray Equipment, LA9300 Series Liquid Applicator, 2 pages, Date Unknown.
Fast, Side-Fold Liquid Injection Applicators, Model 8200, 2 pages, Date Unknown.

* cited by examiner

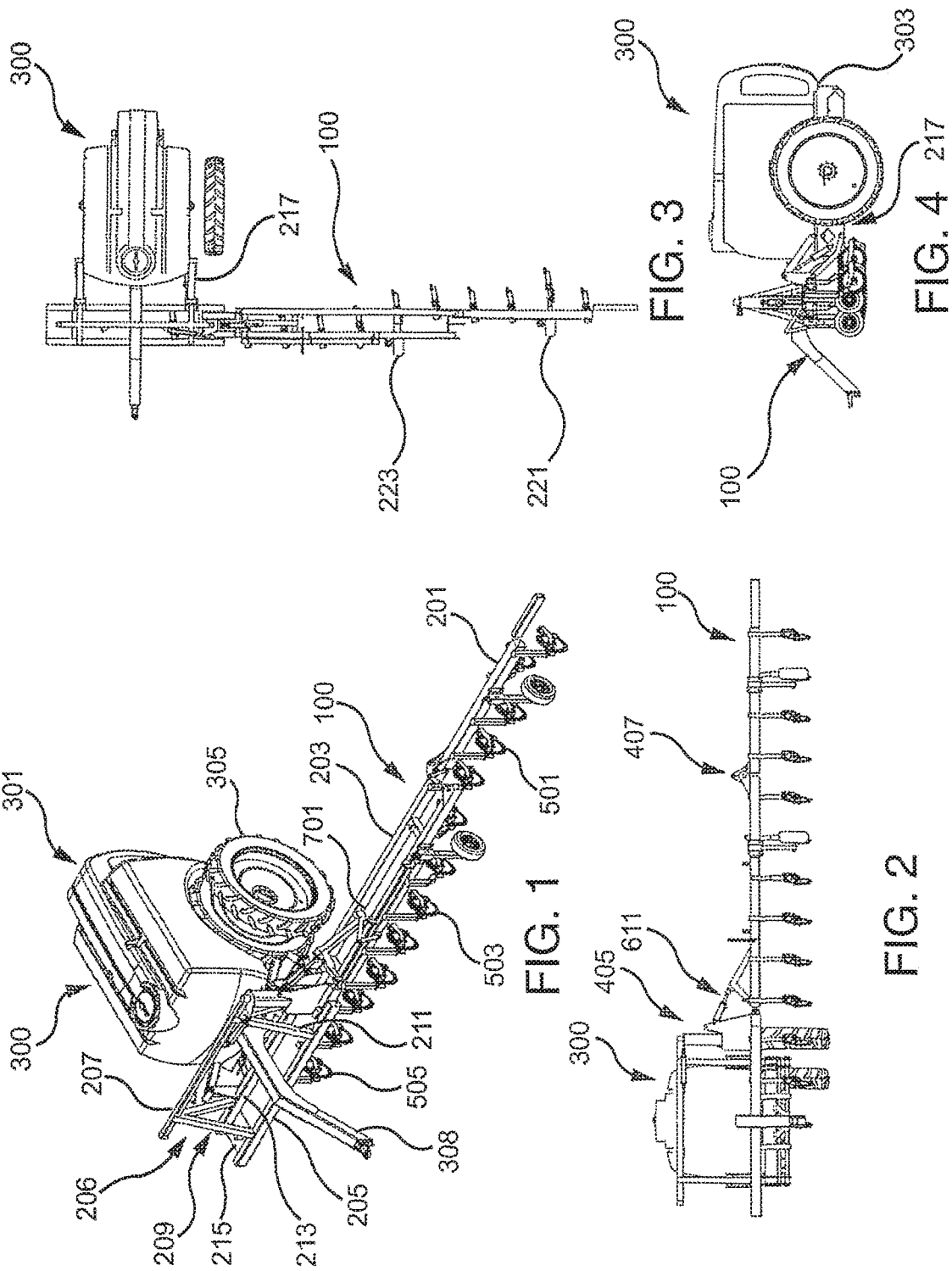

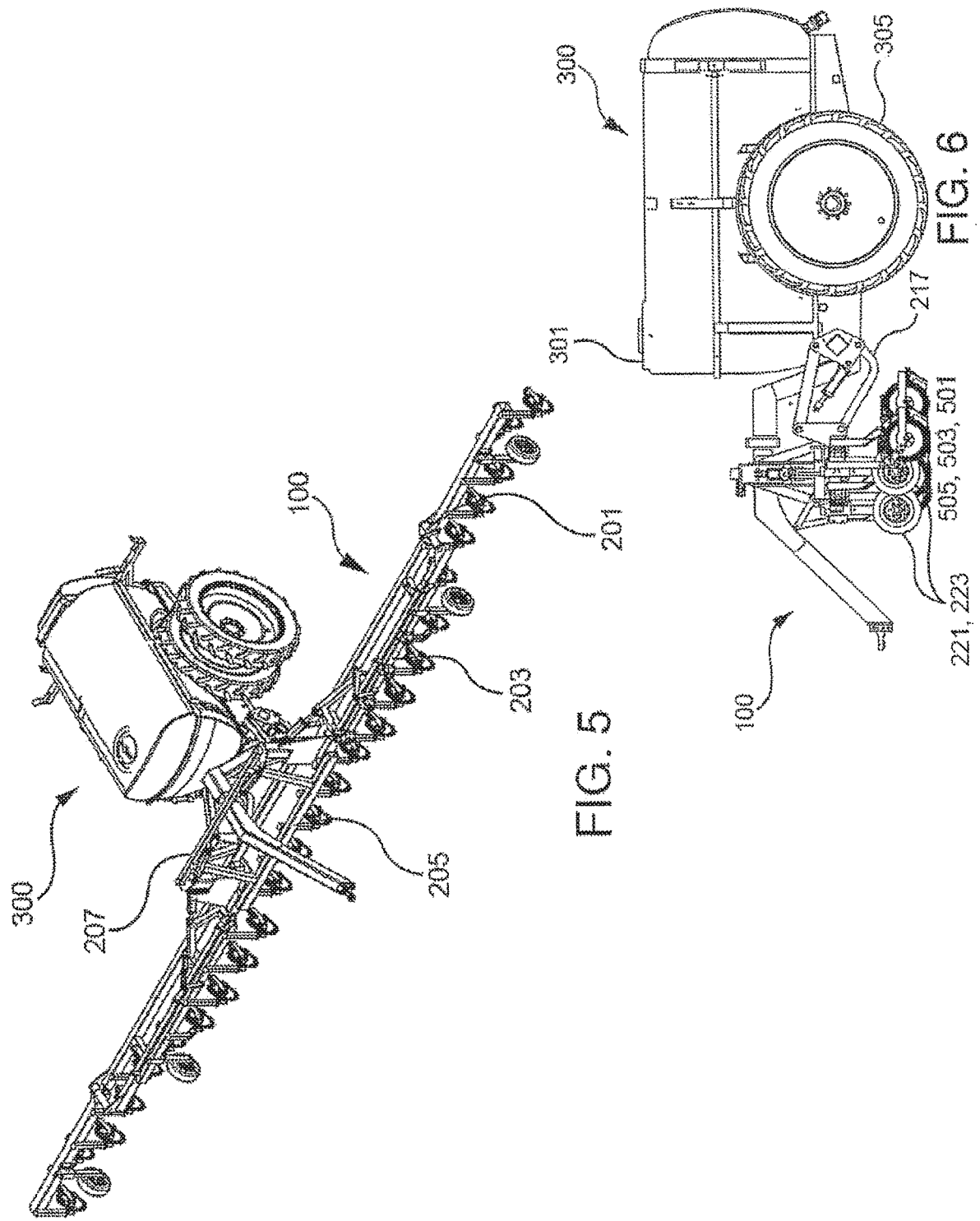

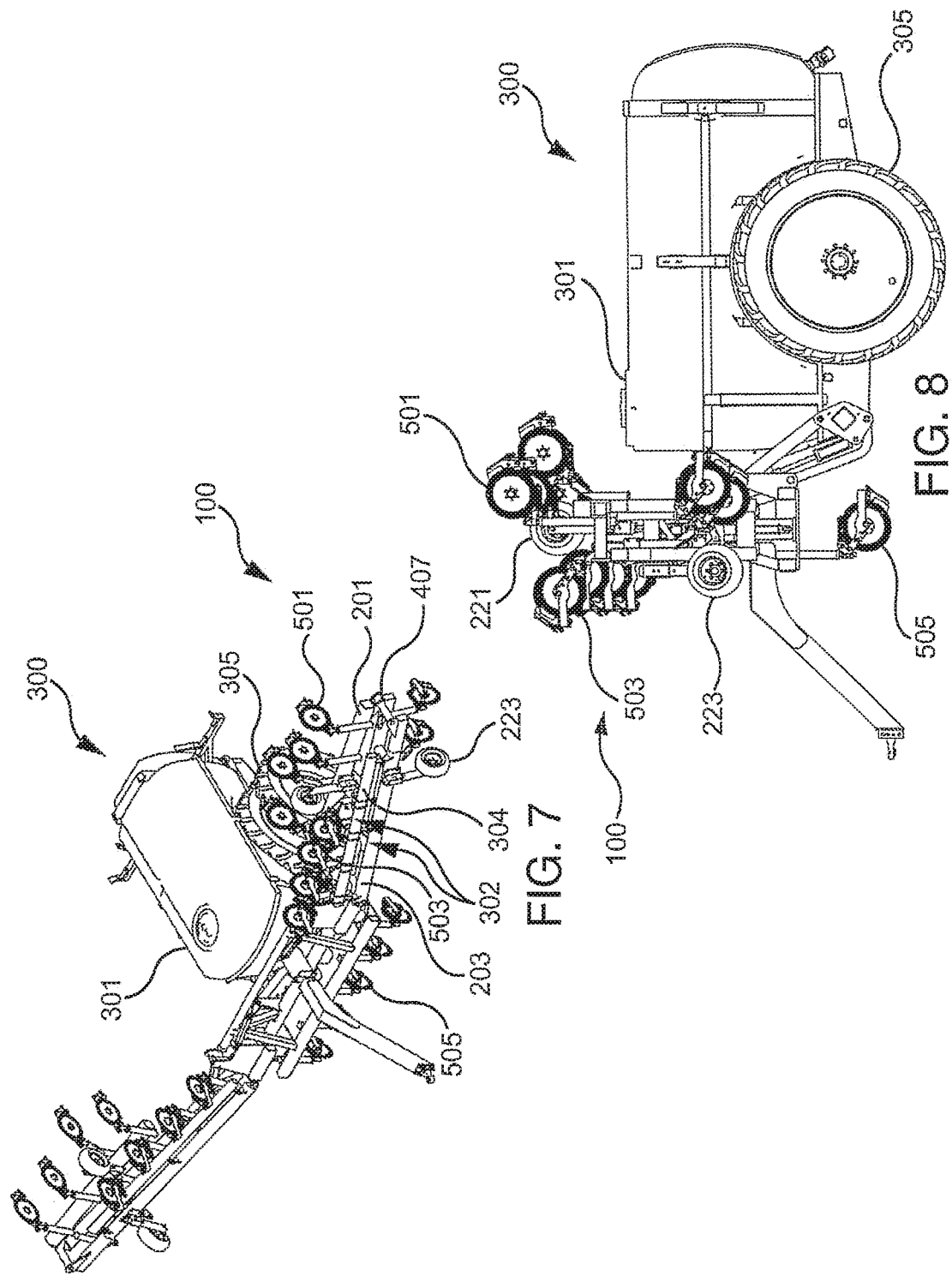

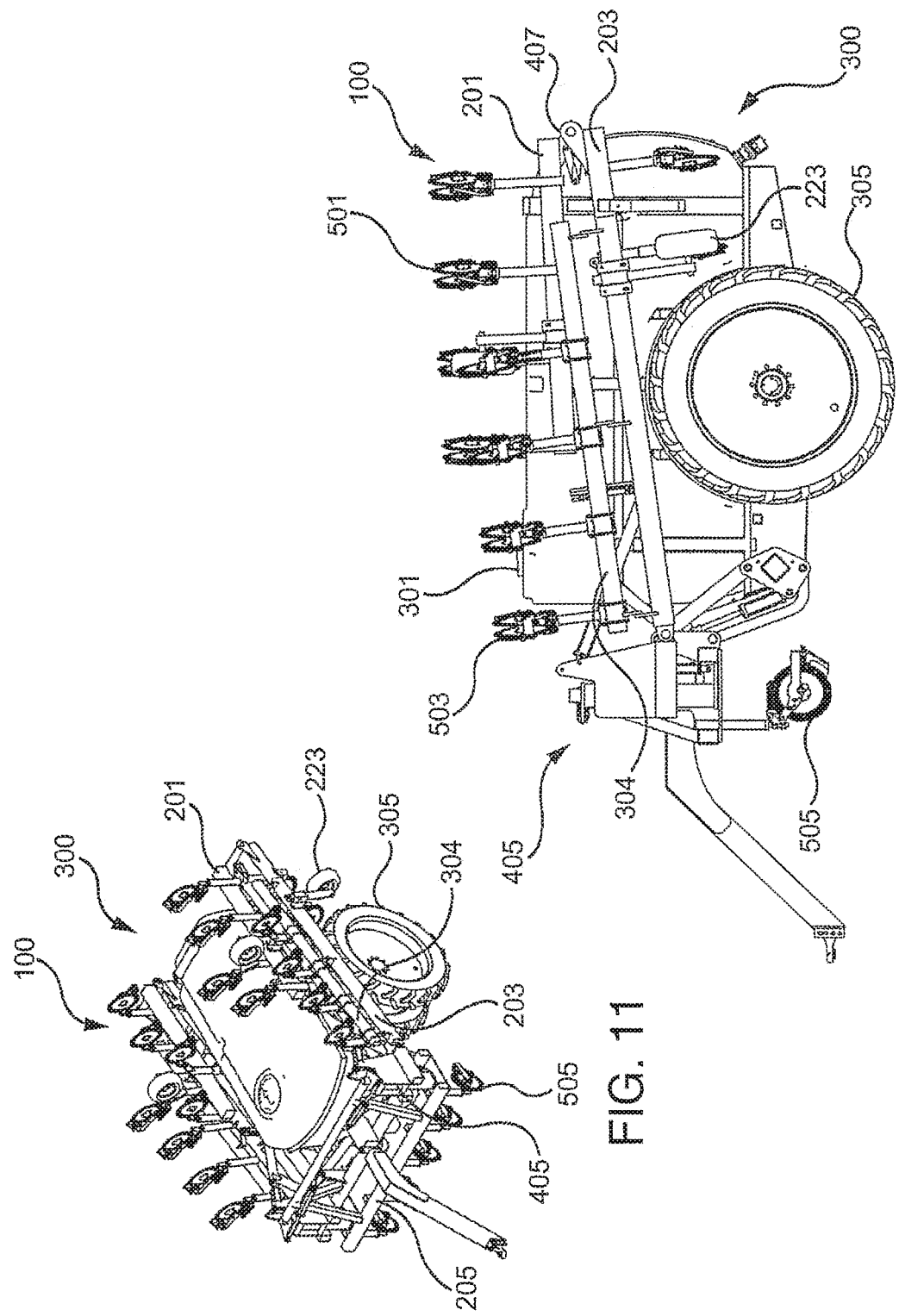

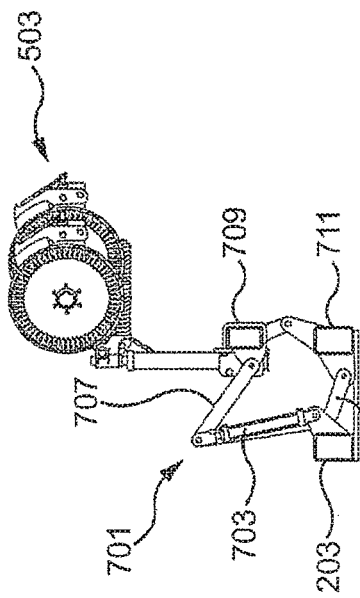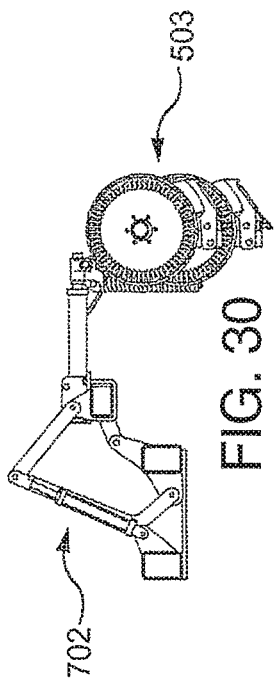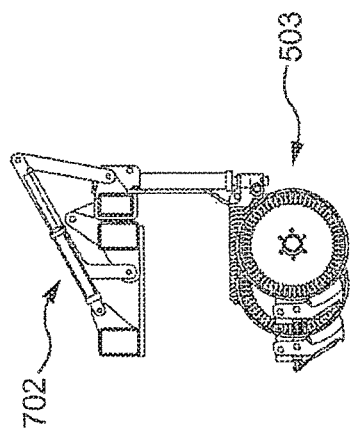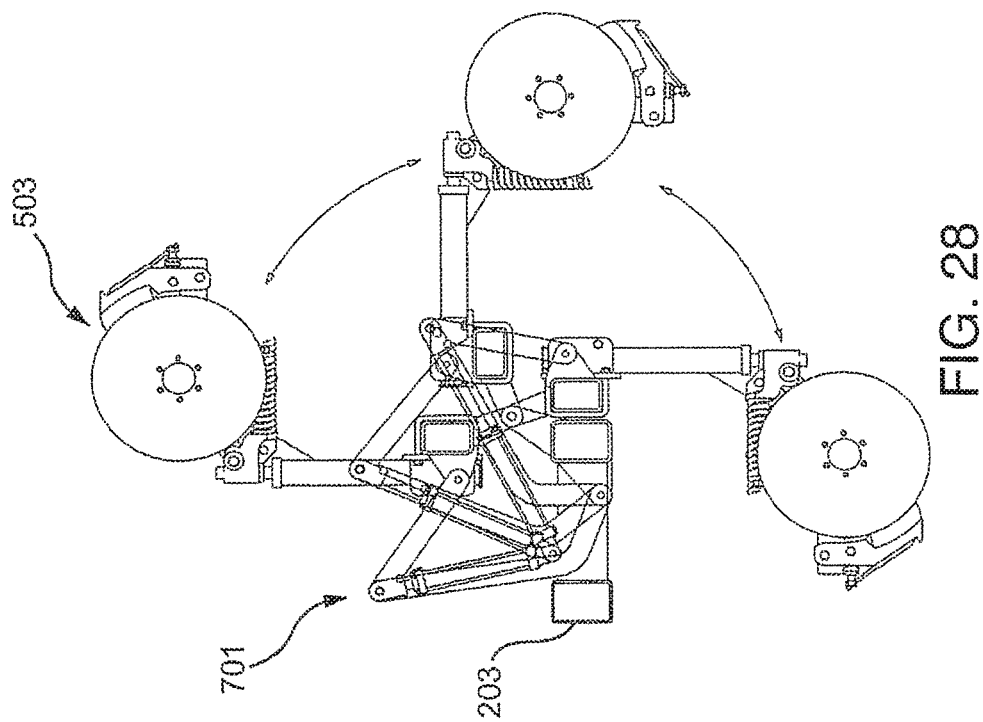

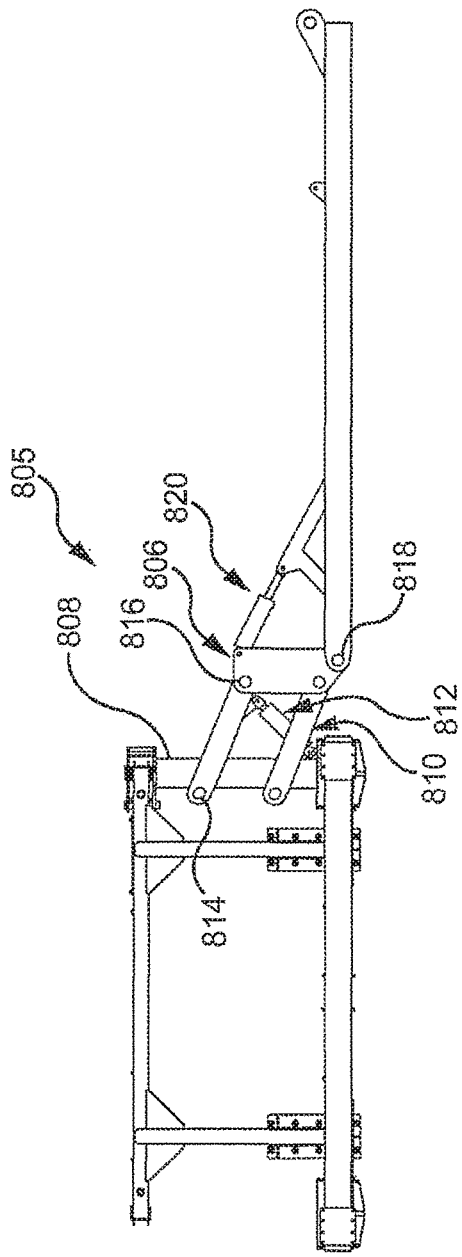
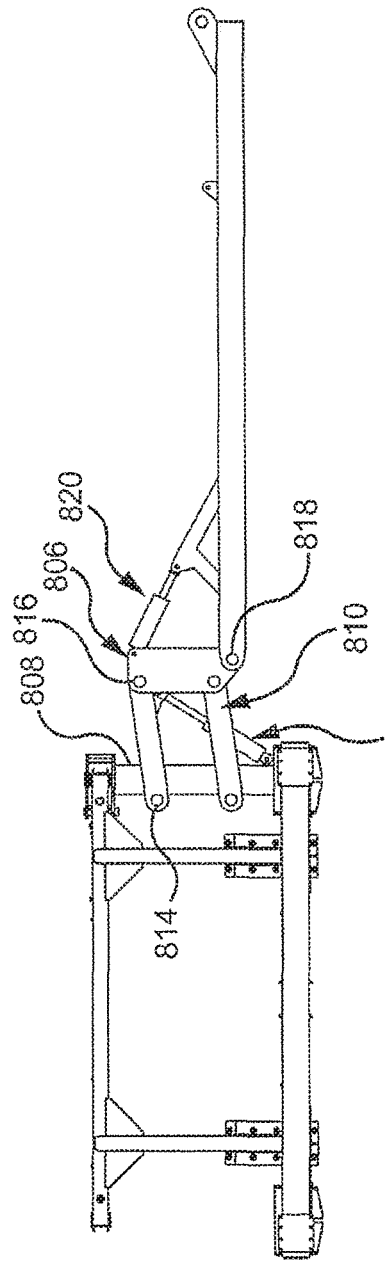

TOOLBAR SYSTEM FOR AN AGRICULTURAL IMPLEMENT

CROSS-REFERENCE TO RELATED APPLICATIONS

This application is a continuation application of U.S. Ser. No. 14/612,849, filed Feb. 3, 2015, which claims the benefit of U.S. Provisional Application 62/040,857, filed Aug. 22, 2014, the entire disclosures of which are incorporated herein by reference.

FIELD OF THE INVENTION

The present invention relates to an agricultural implement with a foldable toolbar system, and, more specifically, to an agricultural implement with a toolbar system having one or more wings adapted to be moveable between an operating position, a transport position, and a shipping position.

DISCUSSION OF THE BACKGROUND ART

In agriculture, implements with folding toolbars are used to perform various tasks, such as spraying various types of liquids, such as fertilizers, herbicides, pesticides, etc., to agricultural crops as the implement is pulled or pushed across a field. In order to cover a large area during operation, the toolbars are positioned horizontally, perpendicular to the implement's direction of travel. When the implement is not in operation, however, it may be difficult to transport or ship the implement to another location due to its dimension and size. Therefore, some toolbars are adapted to fold upwardly or against a side of the implement, but even when folded, the toolbars increase the height or width of the implement, making transport and storage difficult.

SUMMARY OF THE INVENTION

The present invention relates to an agricultural implement with a toolbar system mounted on a carriage for performing tasks, such as spraying liquid, such as liquids for fertilizing soil. Various components of the toolbar system may be operable to move between an operating position, an end use transport position, and a shipping position.

The agricultural implement may comprise a frame having a longitudinal axis and laterally opposed sides, at least one wheel on each side of the frame, a hitch coupled to the frame and adapted for connection to a tow vehicle, and a tank coupled to the frame in order to hold a liquid to be sprayed. The toolbar system mounted on the agricultural implement may include a toolbar frame, an elevator assembly, including a shaft and an elevator, and a plurality of wings, including at least a first wing. The elevator assembly may be coupled to the toolbar frame and moveable vertically relative to the shaft between a first height and a second height. The first wing may include one or more tools, such as a coulter, knife, spike, tine, ripper point, or any combination thereof. The one or more tools coupled to the first wing are adapted to be rotatable relative to a longitudinal axis of the first wing from an operating position below the first wing to a shipping position about the first wing. The first wing may be on one side of the frame and may have an inner portion coupled to the elevator and an outer portion.

The first wing may be pivotable about a first vertical axis of rotation adjacent to the elevator assembly between an extended position where the first wing extends laterally outward from the toolbar frame and a folded position where the first wing is oriented parallel to the longitudinal axis of the frame of the agricultural implement. For example, the first wing may be pivotable when the elevator assembly is pivotable about the first vertical axis of rotation so that the first wing pivots with the elevator assembly. In addition, the first wing may be adapted to be moveable so as to position the first wing higher than the wheel on the same side of the agricultural implement in the folded position.

The first wing of the toolbar frame may be pivotable about a first horizontal axis of rotation parallel to the longitudinal axis of the frame so as to tilt the first wing at a first angle relative to a horizontal plane, such as the ground. The first angle from the horizontal plane is such that the first wing is positioned higher than the wheel on the same side of the implement in the folded position. Further, the first angle and the second height of the elevator, in combination, are such that the first wing is positioned higher than the wheel on the same side of the agricultural implement in the folded position. The second height of the elevator is such that the first wing is positioned higher than the wheel on the same side of the agricultural implement in the folded position. The first horizontal axis of rotation may be adjacent to the first vertical axis of rotation and the first horizontal axis may be moveable vertically relative to the toolbar frame between the first height and the second height associated with the elevator assembly.

The toolbar system may include a second wing having an inner portion pivotably coupled to the outer portion of the first wing to pivot about a second horizontal axis of rotation parallel to the longitudinal axis of the frame between an extended position projecting laterally outward from the first wing and a folded position overhanging the first wing. Additionally, the toolbar system may include a third wing coupled to the toolbar frame. The third wing may be positioned adjacent to the elevator assembly and parallel to the horizontal plane. The second wing and the third wing may also include one or more tools, such as a coulter, knife, spike, tine, ripper point, or any combination thereof.

A method for operating a toolbar system of an agricultural implement is provided, where the agricultural implement may include a frame having a longitudinal axis and laterally opposed sides and at least one wheel on each side of the frame. The toolbar system may have a toolbar frame, an elevator assembly including a shaft and an elevator such that the elevator may be moveable vertically relative to the shaft between a first height and a second height, a first wing coupled to the elevator, and one or more tools coupled to the first wing. The method may comprise rotating, relative to a longitudinal axis of the first wing, the one or more tools coupled to the first wing from an operating position below the first wing to a shipping position above the first wing, pivoting the first wing about a first vertical axis of rotation adjacent to the elevator assembly between an extended position wherein the first wing extends laterally outward from the toolbar frame and a folded position wherein the first wing is oriented parallel to the longitudinal axis of the frame. The method may further comprise moving the first wing so as to position the first wing higher than the wheel on the same side of the agricultural implement in the folded position, and rotating the one or more tools coupled to the first wing such that the one or more tools are positioned approximately parallel to the same side of the agricultural implement.

Additionally, the method may comprise pushing the first wing, in a downward direction, about a first horizontal axis of rotation parallel to the longitudinal axis of the frame such that the first wing is positioned approximately parallel to the same side of the agricultural implement, and pushing the one or more tools coupled to the first wing in a downward direction. For example, moving the first wing includes pivoting the first wing about the first horizontal axis of rotation so as to tilt the first wing at a first angle relative to a horizontal plane, and the first angle is such that the first wing is positioned higher than the wheel on the same side of the agricultural implement in the folded position. The first angle and the second height of the elevator, in combination, may be such that the first wing is positioned higher than the wheel on the same side of the agricultural implement in the folded position. Further, the second height of the elevator may be such that the first wing is positioned higher than the wheel on the same side of the agricultural implement in the folded position.

BRIEF DESCRIPTION OF THE DRAWINGS

FIG. 1 illustrates a perspective view of an agricultural implement with a toolbar system mounted on a carriage in the operating position according to an embodiment of the present invention.

FIG. 2 illustrates a front view of the agricultural implement showing the toolbar system mounted on a carriage in the operating position according to an embodiment of the present invention.

FIG. 3 illustrates a top view of the agricultural implement showing the toolbar system mounted on a carriage in the operating position according to an embodiment of the present invention.

FIG. 4 illustrates a side view of the agricultural implement showing the toolbar system mounted on a carriage in the operating position according to an embodiment of the present invention.

FIG. 5 illustrates a perspective view of the agricultural implement showing the toolbar system with two sets of wings mounted on a carriage in the operating position according to an embodiment of the present invention.

FIG. 6 illustrates a side view of the agricultural implement showing the toolbar system with two sets of wings mounted on a carriage in the operating position according to an embodiment of the present invention.

FIG. 7 illustrates a perspective view of the agricultural implement showing the toolbar system with two sets of wings in which the outer wings have been positioned above the middle wings according to an embodiment of the present invention.

FIG. 8 illustrates a side view of the agricultural implement showing the toolbar system with two sets of wings in which the outer wings have been positioned above the middle wings according to an embodiment of the present invention.

FIG. 11 illustrates a perspective view of the agricultural implement showing the toolbar system with two sets of wings mounted on a carriage in the end user transport position according to an embodiment of the present invention.

FIG. 12 illustrates a side view of the agricultural implement showing the toolbar system with two sets of wings mounted on a carriage in the end user transport position according to an embodiment of the present invention.

FIG. 28 illustrates a side view of the toolbar system according to an embodiment of the present invention showing the flipping of the middle wing coulters in which the positions of the coulters moving from the operating to transport positions are overlayed according to an embodiment of the present invention.

FIG. 29 illustrates a side view of the toolbar system according to an embodiment of the present invention showing the middle wing coulters in a transport position according to an embodiment of the present invention.

FIG. 30 illustrates a side view of the toolbar system according to an embodiment of the present invention showing the middle wing coulters between a transport position and an operating position according to an embodiment of the present invention.

FIG. 31 illustrates a side view of the toolbar system according to an embodiment of the present invention showing the middle wing coulters in an operating position according to an embodiment of the present invention.

FIG. 32 illustrates a front view of an elevator assembly for the toolbar system in an operating position according to an alternative embodiment of the present invention.

FIG. 33 illustrates a front view of the elevator assembly of FIG. 32 in which the elevator has been raised.

DETAILED DESCRIPTION OF THE PRESENT INVENTION

Figures 9, 10:
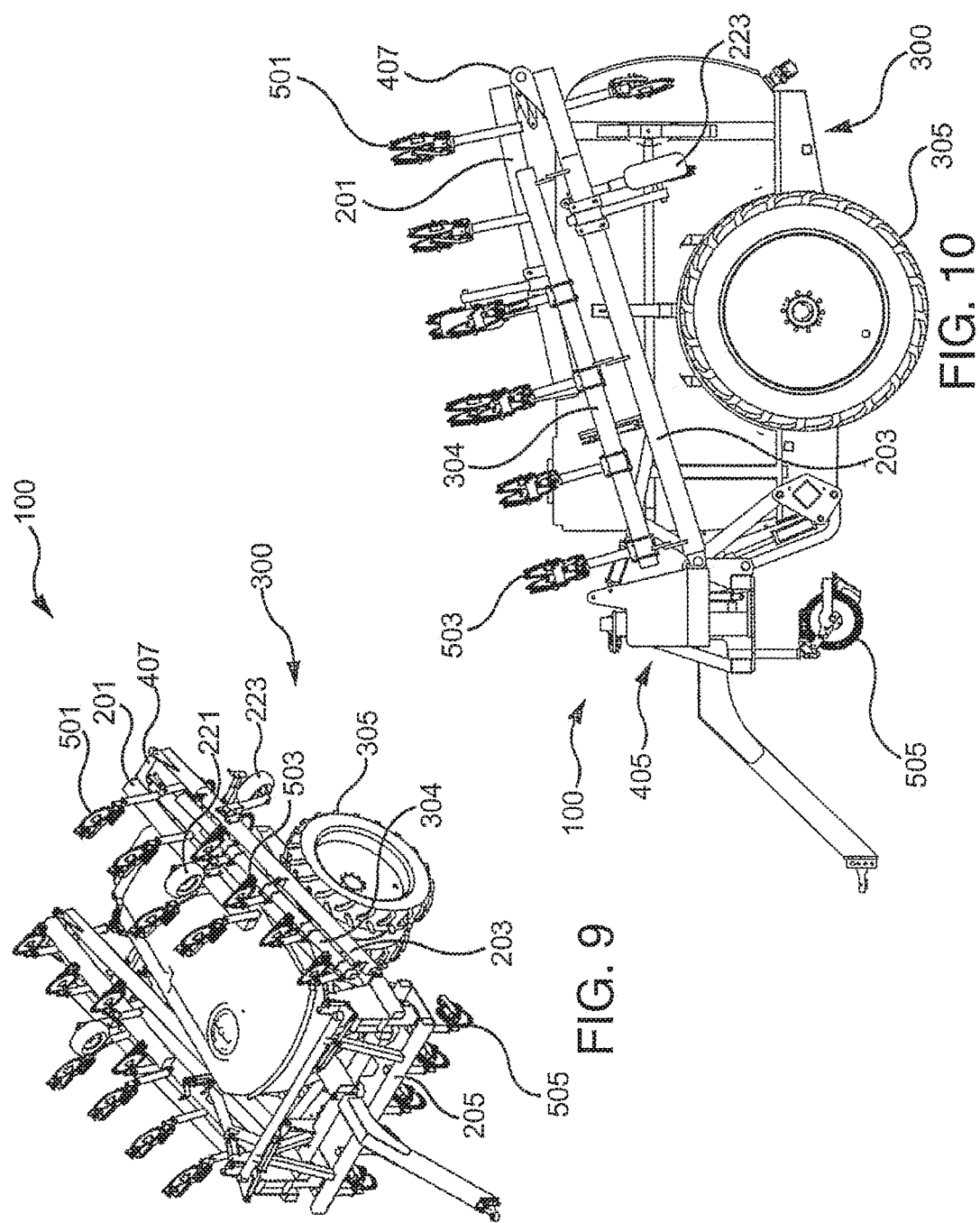
FIG. 9 illustrates a perspective view of the agricultural implement showing the toolbar system with two sets of wings in which the middle wings and outer wings have been positioned approximately parallel to a direction of travel according to an embodiment of the present invention.
FIG. 10 illustrates a side view of the agricultural implement showing the toolbar system with two sets of wings in which the middle wings and outer wings have been positioned approximately parallel to a direction of travel according to an embodiment of the present invention.
Figure 13:
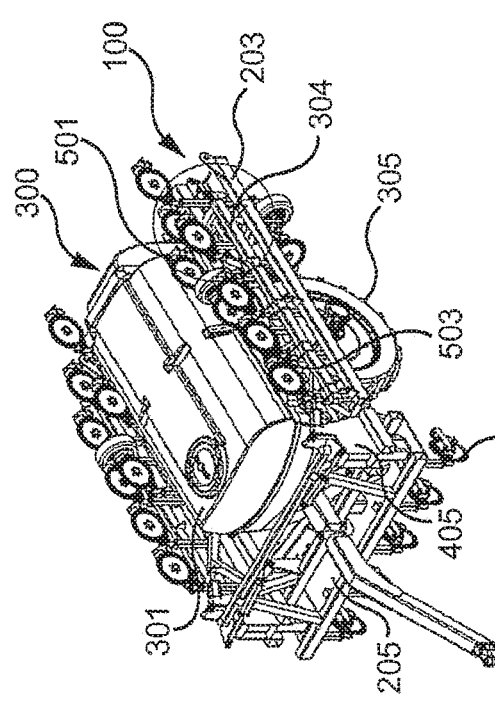
FIG. 13 illustrates a perspective view of the agricultural implement showing the toolbar system with two sets of wings mounted on a carriage in the shipping position according to an embodiment of the present invention.
Figure 14:
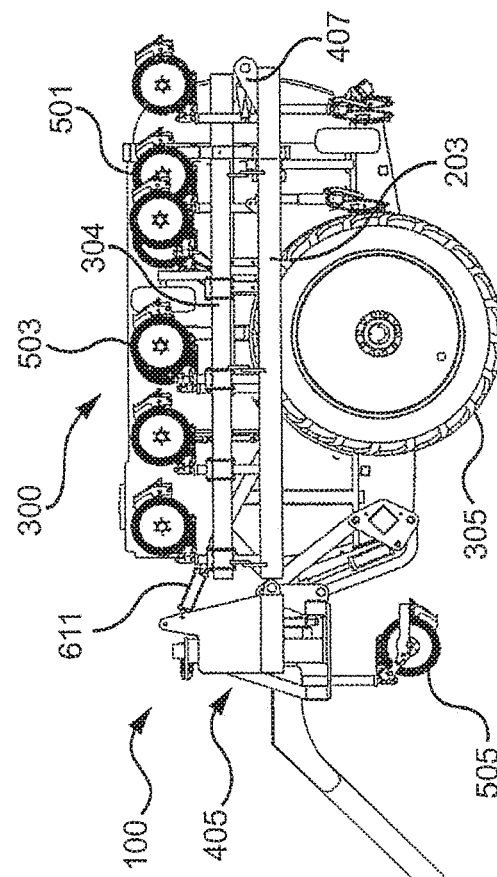
FIG. 14 illustrates a front view of the agricultural implement showing the toolbar system with two sets of wings mounted on a carriage in the shipping position according to an embodiment of the present invention.
Figure 15:
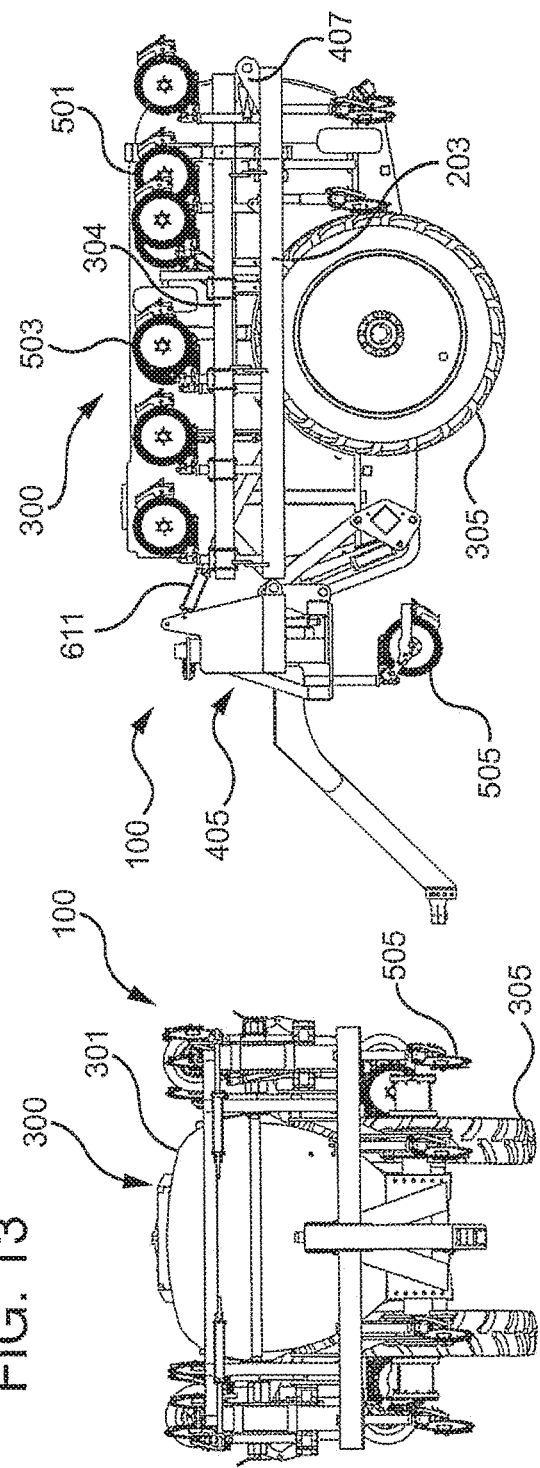
FIG. 15 illustrates a side view of the agricultural implement showing the toolbar system with two sets of wings mounted on a carriage in the shipping position according to an embodiment of the present invention.
Figure 16:
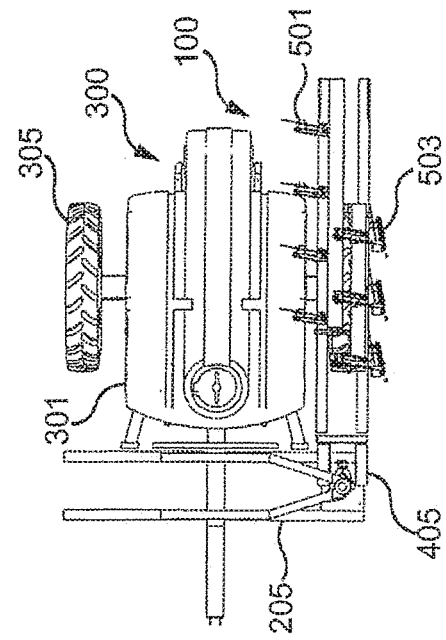
FIG. 16 illustrates a front view of the agricultural implement showing the toolbar system mounted on a carriage in the end user transport position according to an embodiment of the present invention.
Figure 17:
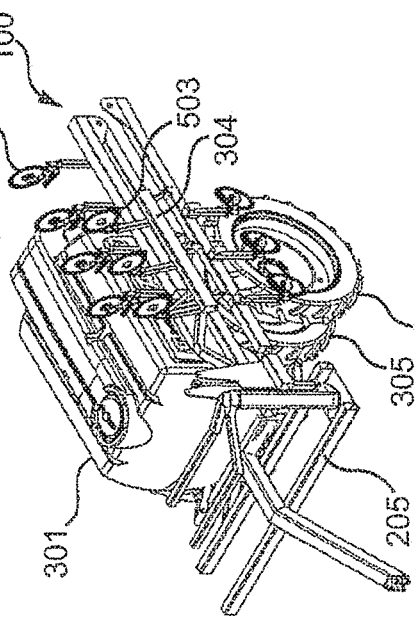
FIG. 17 illustrates a top view of the agricultural implement showing the toolbar system mounted on a carriage in the end user transport position according to an embodiment of the present invention.
Figure 18:
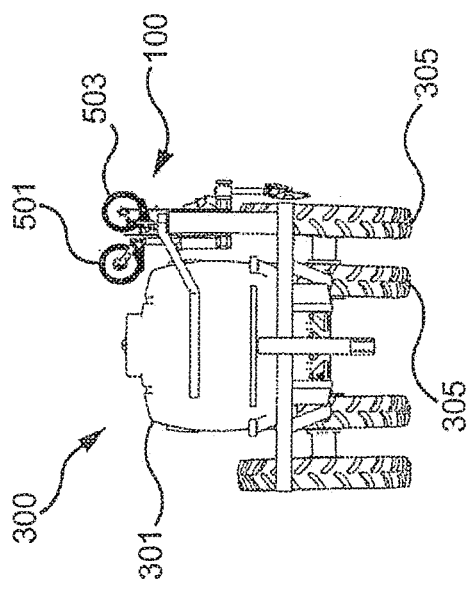
FIG. 18 illustrates a side view of the agricultural implement showing the toolbar system mounted on a carriage in the end user transport position according to an embodiment of the present invention.
Figure 19:
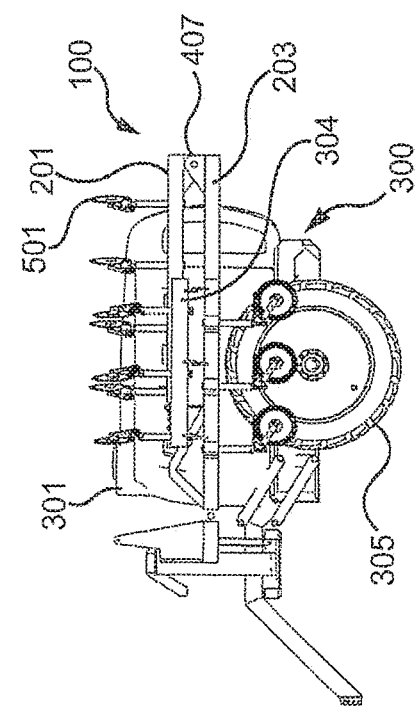
FIG. 19 illustrates a perspective view of the agricultural implement showing the toolbar system mounted on a carriage in the end user transport position according to an embodiment of the present invention.
Figure 20:
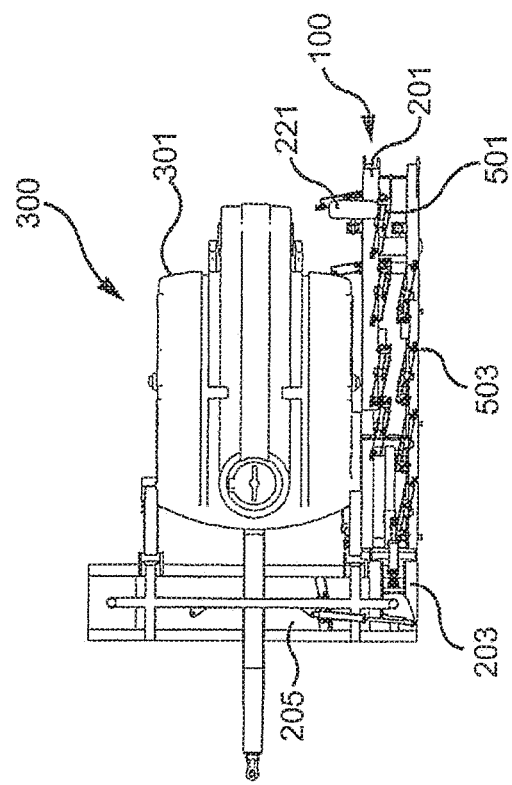
FIG. 20 illustrates a perspective view of the agricultural implement showing the toolbar system mounted on a carriage in the shipping position according to an embodiment of the present invention.
Figure 22:
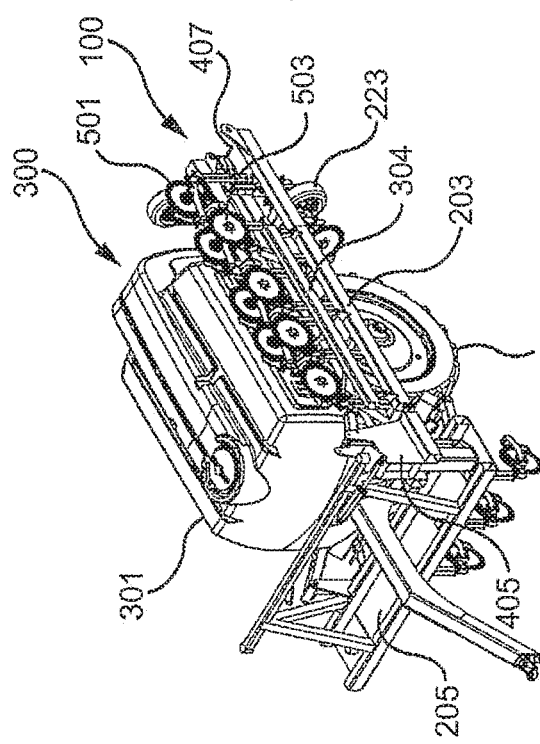
FIG. 22 illustrates a top elevation view of the agricultural implement showing the toolbar system mounted on a carriage in the shipping position according to an embodiment of the present invention.
Figure 21:
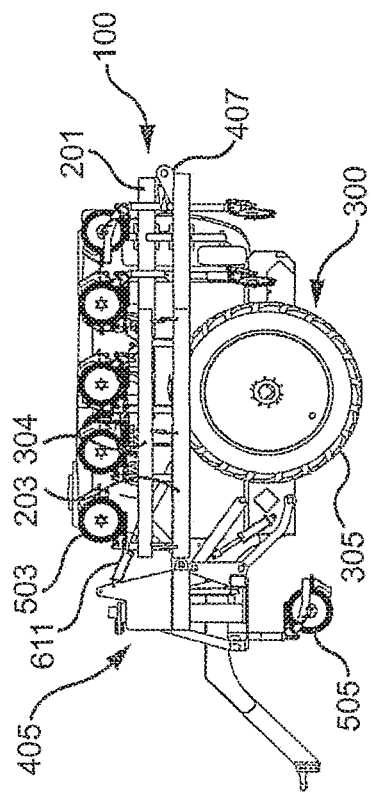
FIG. 21 illustrates a front view of the agricultural implement showing the toolbar system mounted on a carriage in the shipping position according to an embodiment of the present invention.
Figure 23:
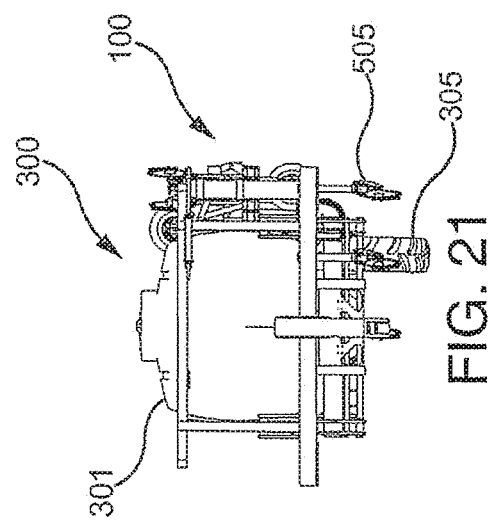
FIG. 23 illustrates a side view of the agricultural implement showing the toolbar system mounted on a carriage in the shipping position according to an embodiment of the present invention.
Figure 24:
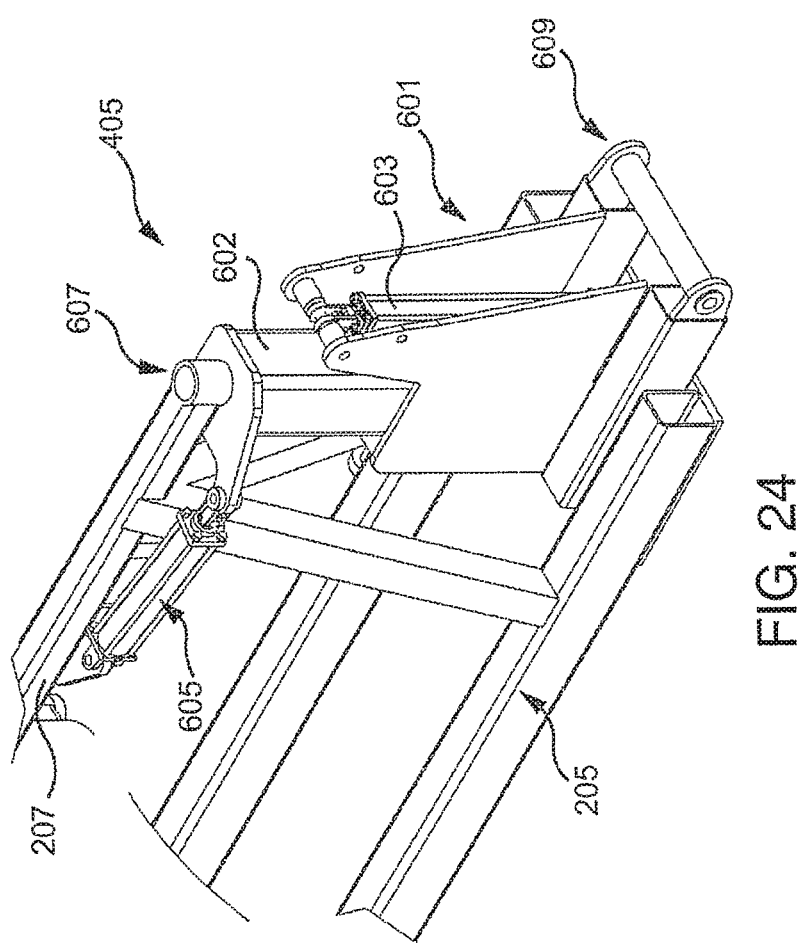
FIG. 24 illustrates a perspective view of an elevator assembly for the toolbar system according to an embodiment of the present invention.

While the present invention may be embodied in many different forms, a number of illustrative embodiments are described herein with the understanding that the present disclosure is to be considered as providing examples and not intended to limit the invention to the preferred embodiments described and/or illustrated herein.

In an embodiment of the present invention, the toolbar system includes a plurality of wings, including at least one outer wing, at least one middle wing, and at least one inner wing. In an embodiment of the present invention, the toolbar system may include at least one inner wing and one or more middle wings. In another embodiment, the toolbar system may include only one or more middle wings. The toolbar system may also include one or more tools, such as coulters, attached to one or more of the wings and configured to work or condition the soil in some way. However, the present invention is not restricted to coulters, and it will be appreciated that any suitable tools may be coupled to the wings of the toolbar. The toolbar may be operable to move between an operating position, an end user transport position, and a shipping position, which will be described in greater detail below.

FIGS. 1-6 illustrate an agricultural implement 300 with a toolbar system 100 in the operating position according to an embodiment of the present invention. The toolbar system 100 may include one set of wings, as shown in FIGS. 1-4, or two sets of wings, as shown in FIGS. 5 and 6. The implement 300 may be an agricultural sprayer and may include a storage tank 301, a frame 303, carriage wheels 305 and a hitch 308. Storage tank 301 may be supported by frame 303 which is mounted on wheels 305 for transport. In the embodiment shown, two wheels 305 are mounted on opposite lateral sides of the frame 303. In alternative embodiments, frame 303 may be mounted on tracks for transport. The hitch 308 may extend from frame 303 and may be configured to mate with a coupling on a tow vehicle, such as a tractor, to permit the implement to be towed behind the tow vehicle. Examples of suitable couplings include, e.g., a three-point connection, a draw bar, or any other type of suitable tow coupling known in the industry. The toolbar system 100 may be mounted to the frame 303 of the implement 300. In an embodiment, the toolbar system 100 is mounted to frame 303 between storage tank 301 and hitch 308.

The toolbar system 100 may include an outer wing 201, a middle wing 203, an inner wing 205, a toolbar frame 206, and an elevator assembly or system 405. In an embodiment, wings 201, 203, and 205 may include a series of spaced nozzles for spraying liquids from storage tank 301. The toolbar system may include gauge wheels 221 and 223 coupled to the wings. It is appreciated that the toolbar system 100 can be used with or without the gauge wheels. Each of the wings may further include a set of tools, such as coulters, e.g., the outer wing 201 may include outer wing coulters 501, the middle wing 203 may include middle wing coulters 503, and the inner wing 205 may include inner wing coulters 505. In an embodiment of the present invention, tools or equipment other than coulters may be mounted to the wings, such as knives, spikes, tines or ripper points. It will also be appreciated that no tools may be mounted to some of the wings, e.g., the inner wing may have no tools mounted on it. The toolbar frame 206 is configured to mount to frame 303 and support the wings. For example the toolbar frame 206 may include a top frame member 207, transverse frame members 209 and 211, a bottom frame member 213, elevator supports 215 and toolbar system coupling mechanisms 217. The transverse members 209 and 211 extend between the top frame member 206 and the bottom frame member 213 and inner wing 205. The bottom member 213 is positioned approximately behind the inner wing 205, and the bottom member may also have coulters and wheels mounted on it. The elevator supports 215 are positioned between the inner wing 205 and bottom frame member 213, and are configured to support the elevator assembly 405. The toolbar system coupling mechanisms 217 are coupled to the bottom frame member 213 at a first end and the carriage frame 303 at a second end. In an embodiment of the present invention, the toolbar system coupling mechanisms 217 may be a four bar linkage with an actuator configured to move the position of the bottom frame member 213 relative to the implement 300. Adjusting the actuator may lower or raise the rest of the toolbar system relative to the ground, e.g., contracting the actuator may move the rest of the toolbar system closer to the ground and extending the actuator raises the rest of the toolbar system.

In an embodiment of the present invention, the wings 201, 203 and 205 may be a separate component from the toolbar frame 206. In this configuration, the toolbar frame 206 may be mounted to the carriage frame 303 and the toolbar system coupling mechanism 217 may be coupled to the wings 201, 203, 205 such that the wings 201, 203, 205 may move relative to the carriage frame 303 via the toolbar system coupling mechanism.

The toolbars in FIGS. 1-6 are shown in an extended or operating position in which middle wing 203 extends laterally outward from toolbar frame 206 and outer wing 201 extends laterally outward from an outer end of middle wing 203. In an embodiment, respective longitudinal axes of middle and outer wings 203 and 201 are aligned and collinear.

Referring now to FIGS. 7 and 8, an inner end of the outer wing 201 is pivotably coupled to the outer end of the middle wing 203 such that the outer wing 201 may be rotated about a first horizontal axis of rotation relative to the middle wing 203. In an embodiment of the present invention, a hinge or a linkage with an actuator 407 may be coupled to the middle wing 203 and the outer wing 201 that allows the outer wing 201 to rotate about the first horizontal axis of rotation. In the embodiment with the linkage and actuator 407, the actuator may be used to pivot the outer wing 201 between an operating and transport or shipping position, and the actuator may be a hydraulic cylinder. In an embodiment, the first horizontal axis of rotation is perpendicular to the longitudinal axis of the middle wing 203 such that the outer wing 201 can be folded over and on top of the middle wing 203. In the folded position, the tools on the outer wing preferably extend upwardly as shown. In an embodiment, middle wing 203 may include a pair of parallel wing members 302 spaced apart from one another, with one of the wing members 304 carrying tools, and the outer wing 201 may be positioned to fold over and on top of the other middle wing member which provides an advantage that the tools coupled to the outer wing 201 do not interfere or touch the tools that may be coupled to the middle wing 203.

Referring now to FIGS. 9-12, an inner end of the middle wing 203 may be pivotably coupled to the elevator assembly or system 405 such that the middle wing 203 may rotate about a second horizontal axis of rotation. In an embodiment, the second horizontal axis of rotation is perpendicular to the longitudinal axis of the middle wing 203 so that middle wing can be pivoted upwardly and downwardly about the second horizontal axis of rotation. When the middle wing 203 is pivoted about the second horizontal axis of rotation, the outer wing 201 folded on top of the middle wing rotates with the middle wing as a unit. In an embodiment of the present invention, a middle wing actuator 611 may be coupled to the elevator assembly or system 405 and the middle wing 203 to cause the middle wing 203 to pivot about the second horizontal axis of rotation. The toolbar system may include gauge wheels 221 and 223 coupled to the wings. It is appreciated that the toolbar system 100 can be used with or without the gauge wheels. The toolbar system may include gauge wheels 221 and 223 coupled to the wings. It is appreciated that the toolbar system 100 can be used with or without the gauge wheels. Moreover, as illustrated in FIGS. 5 and 6, the toolbar system may consist of more than one middle wing and more than one outer wing, i.e., a middle wing and an outer wing on each side of the implement. Alternatively, the toolbar system may only include a middle wing.

The elevator assembly or system 405 is shown in greater detail in FIGS. 24-27 according to a preferred embodiment of the invention. The elevator assembly 405 may include an elevator or mast 601, a shaft 602, a vertical actuator 603, an elevator system actuator 605, a vertical hinge 607, a middle wing actuator 611, a horizontal hinge 609, and an elevator floor 613. The elevator assembly 405 may also include rollers 621 and 623. The elevator 601 includes an opening, and the elevator 601 is positioned such that the shaft 602 engages the opening of the elevator 601 and guides the elevator 601 when it is elevated from a first height to a second height. For example, the first height may be where the elevator 601 engages the lowermost portion of the shaft 602. The second height may be anywhere between the first height and the uppermost portion of the shaft 602. Thus, the vertical actuator 603 may be adapted to elevate the elevator 601 to its respective height along the shaft 602.

The middle wing 203 is pivotably coupled to the elevator 601 such that the middle wing 203 may pivot about a second horizontal axis of rotation, as discussed above. For example, the horizontal axis of rotation may correspond to the horizontal hinge 609. The middle wing actuator 611 is pivotably coupled to the elevator 601 at a first end and to the middle wing 203 at an opposite end. The middle wing 203 may pivot about the second horizontal axis of rotation by extending or contracting the middle wing actuator 611. In that regard, the middle wing (and the pivotably coupled outer wing) may tilt up or down relative to a horizontal plane, such as the ground, by extending or contracting the middle wing actuator 611. For instance, as the middle wing actuator 611 contracts, the middle wing may pivot about horizontal hinge 609 to tilt away from the ground at a particular angle. This angle may vary depending on the range of contraction or extension of the middle wing actuator 611. The physical length of the middle wing actuator 611 may also change the range of the angle of tilt. By way of example, if the middle wing actuator 611 is shorter in length, the middle wing may be able to tilt at a greater angle. In an embodiment of the present invention, the actuator 611 may be a hydraulic cylinder.

The elevator assembly 405 is pivotably coupled to the toolbar frame 206 such that the elevator assembly 405 may pivot about a vertical axis of rotation relative to the toolbar frame 206. In an embodiment of the present invention, the shaft 602 may be pivotably coupled to the frame by vertical hinge 607, which allows shaft 602 and the elevator 601 to rotate about a vertical axis of rotation. In an embodiment of the present invention, the elevator 601 is configured such that when the wings are in an operating position the elevator 601 is positioned and "locked" between the inner wing 205 and the bottom frame 213, which prevents the elevator system 405 from rotating about the vertical axis. The elevator system actuator 605 is pivotably coupled to the top frame member 207 at a first end and to the shaft 602 on an opposite end. The shaft 602 may pivot about a vertical axis approximately perpendicular relative to the inner wing 205 by extending or contracting the elevator system actuator 605. For example, when the elevator system actuator 605 is fully contracted, the elevator 601 and the middle wing coupled to the elevator 601 may be in an extended position, where the middle wing extends laterally outward from the toolbar frame 206. When the elevator system actuator 605 extends, it causes the shaft 602 to pivot. As such, the elevator 601 and the middle wing may be in a folded position, where the middle wing is oriented parallel to a longitudinal axis of the toolbar frame 206. In that regard, moving the middle wing (and the outer wing) from the extended operating position to the folded position may reduce the overall width of the agricultural spray implement to place for transporting or shipping same.

The elevator assembly 405 may have its own floor 613 or the elevator support 215 may function as the elevator floor. When the elevator assembly 405 has its own floor 613, the floor 613 is coupled to the elevator support 215. When the elevator assembly 405 does not have its own floor 613, the shaft 602 may include an opening on the bottom that engages a protrusion on the elevator support 215. In an embodiment of the present invention, the floor 613 is coupled between inner wing 205 and bottom frame 213 with elevator support 215 being coupled to floor 613. In an alternative embodiment, the inner wing 205 could be separated from the bottom frame 213 and top frame member 207, and the top frame and bottom frame members would be attached to frame 303 or hitch 308 such that they would not be moved by the toolbar system coupling mechanism 217.

Figure 25:
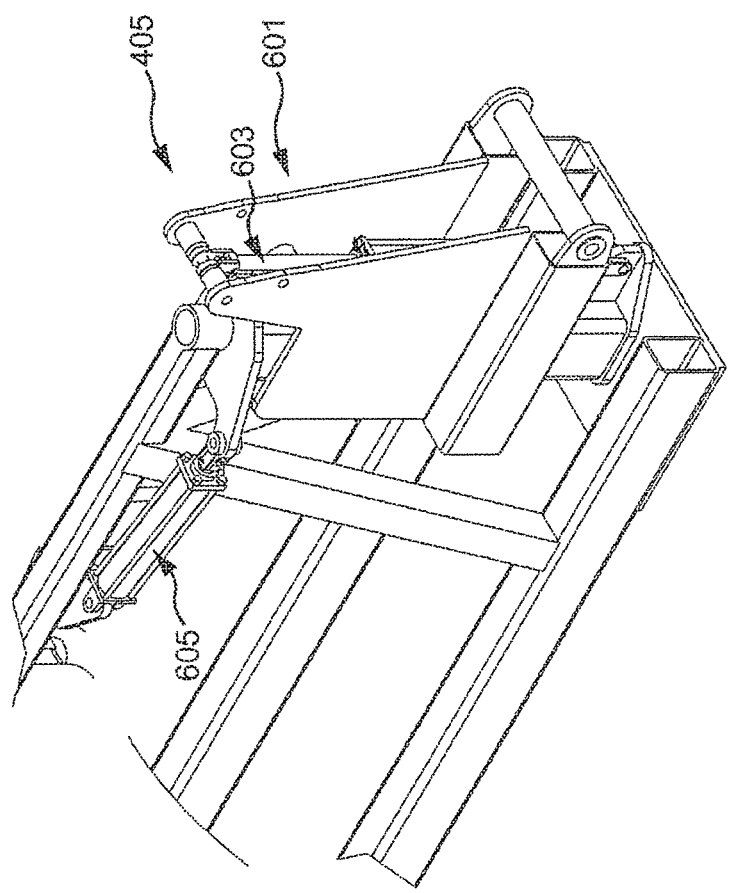
FIG. 25 illustrates a perspective view of the elevator assembly for the toolbar system in which the elevator has been raised according to an embodiment of the present invention.

As shown in FIG. 25, the elevator 601 may be elevated by extending the vertical actuator 603, which causes the middle wing 203 pivotably coupled to the elevator 601 to be raised to a certain height above the inner wing 205. The vertical actuator 603 is attached to the elevator 601 on a first end and attached to the shaft 602 on an opposite end such that the elevator 601 is elevated or lowered by extending or contracting the vertical actuator 603, as noted above. The actuators 603, 605, and 611 may be a hydraulic cylinder or other devices that can move or control components of the toolbar system 100.

Figure 26:
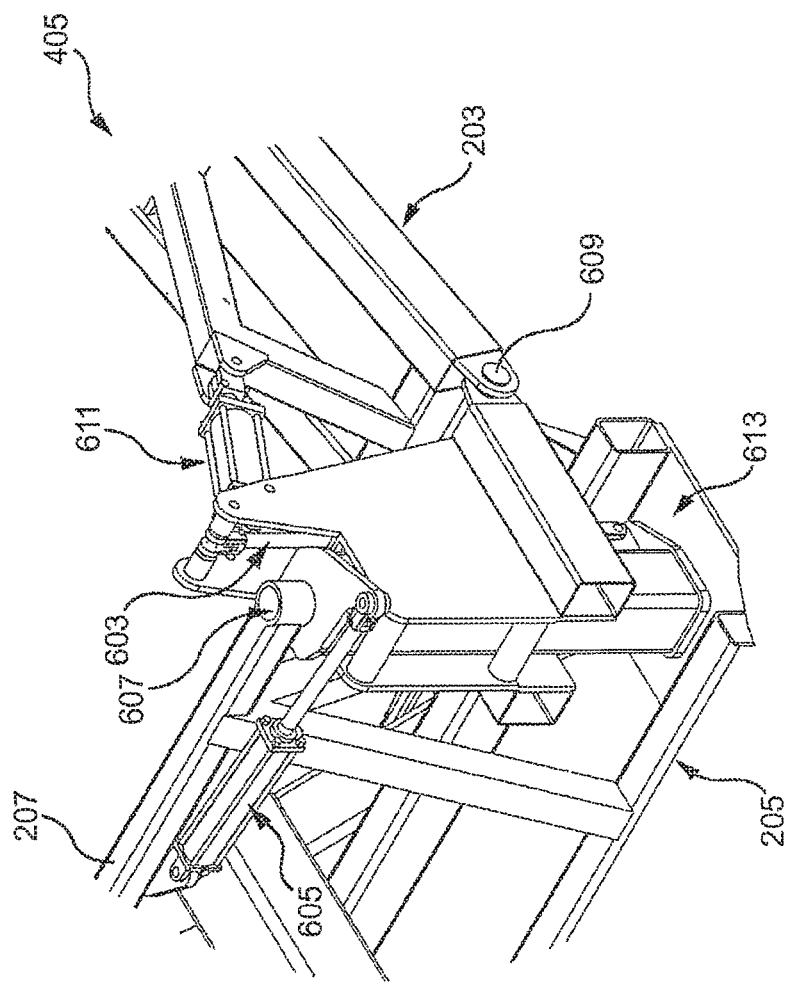
FIG. 26 illustrates a perspective view of the elevator assembly for the toolbar system in which the elevator has been raised and rotated backwards according to an embodiment of the present invention.
Figure 27:
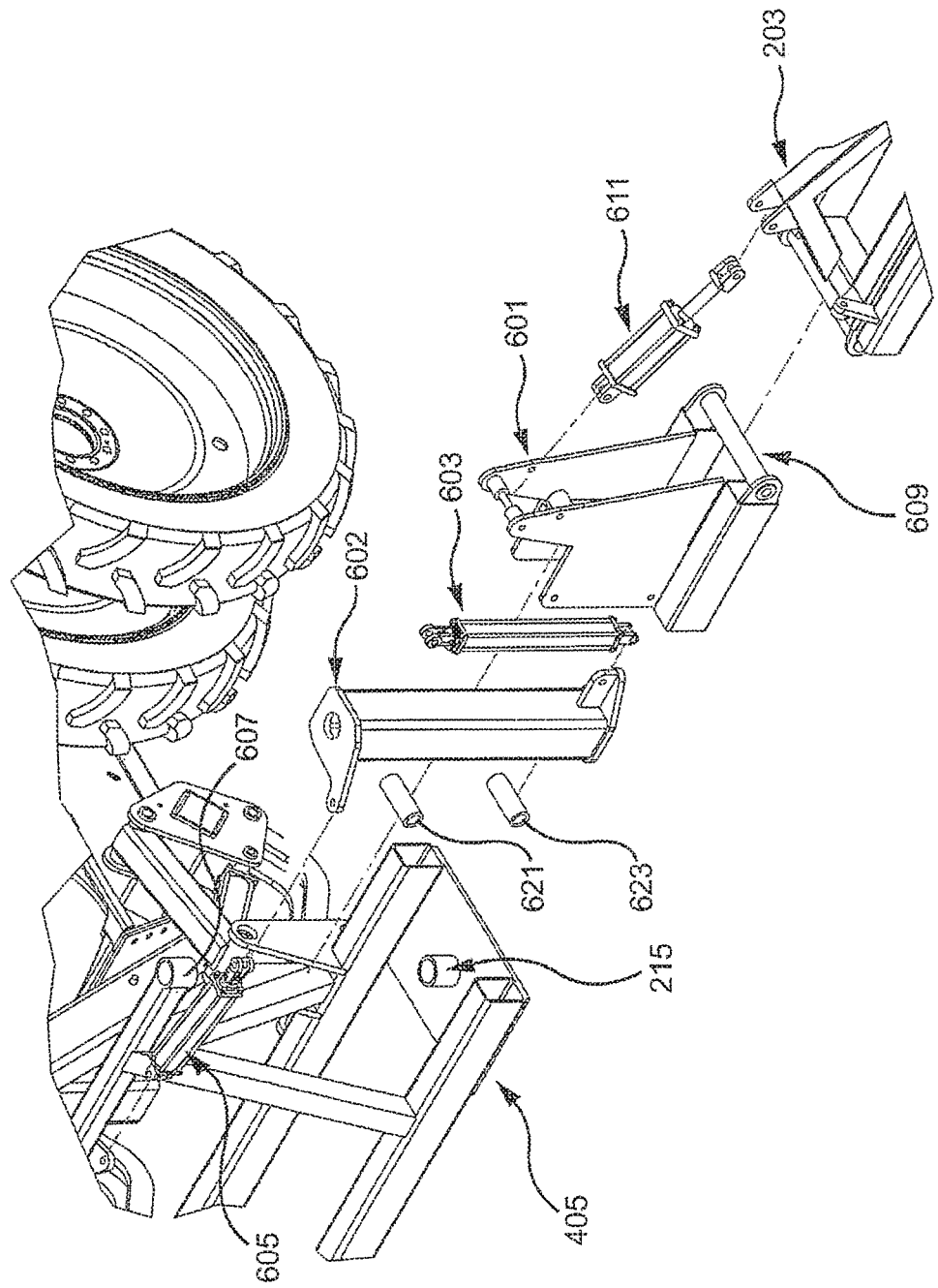
FIG. 27 illustrates an exploded view of the elevator assembly for the toolbar system according to an embodiment of the present invention.

As depicted in FIG. 26, the vertical movement of the elevator 601 and the tilting feature of the middle wing via the middle wing actuator 611, individually or in combination, may allow the middle wing to be positioned higher than the wheel on the same side of the agricultural spray implement in the folded position. Subsequently, as will be further described below, the middle wing may be lowered in the folded position via the elevator 601 and/or the tilting feature to reduce the overall height of the agricultural spray implement in the transport or shipping position. For example, the elevator 601 may be elevated from a first height to a second height to sufficiently clear the carriage wheels 305 on the same side of the spray implement when the middle wing pivots about the vertical axis. In another example, only the middle wing may be titled away from the ground at an angle so as to sufficiently clear the carriage wheels 305 on the same side of the spray implement when the middle wing again pivots about the vertical axis. In yet another example, the elevator 601 may be elevated to a certain height and the middle wing tilted away from the ground at a particular angle, in combination, so that the middle wing may be able to clear the carriage wheels 305 on the same side of the spray implement in the folded position. Then, the middle wing may be lowered via the elevator 601 and/or tilted back toward the ground using at least the middle wing actuator 611 to reduce the overall height of the spray implement and to place it in the transport or shipping position.

As illustrated in FIGS. 28-31, the middle wing coulters 503 may be adapted to move or rotate relative to the middle wing 203 between an operating position in which the coulters 503 extend downwardly relative to the middle wing 203 and a transport or shipping position in which the coulters 503 are positioned above the middle wing 203. The middle wing coulters 503 are pivotably coupled to the middle wing 203 by a coulter linkage 701. The coulter linkage 701 includes an actuator 703, a first linkage member 705 and a second linkage member 707. The actuator 703 may be a hydraulic cylinder. The actuator is pivotably coupled to the middle wing 203 at a first end and to a second end of the first linkage member 705 at a second end. The first end of the first linkage member 705 is pivotably coupled to the coulter support 709, and the second end of the first linkage member 705 is pivotably coupled to the first end of the second linkage member 707. The second end of the second linkage member 707 is pivotably coupled to the coulter base 709. The coulter base 709 is also pivotably coupled to the coulter support 711. The actuator 703 may move or rotate the coulters 503 relative to the longitudinal axis of the middle wing between an operating position below the middle wing to a transport or shipping position above the middle wing. For example, extending or contracting the hydraulic cylinder actuator 703 moves or rotates the coulters 503 below or above the middle wing, respectively. In another embodiment, the second end of the actuator 703 may be coupled to the second linkage 707 or to both the first linkage 705 and second linkage 707. In that regard, an operator of the toolbar system may move or rotate the coulters 503 by extending or contracting the hydraulic cylinder actuator 703, as opposed to rotating the entire middle wing in order to rotate the coulters.

In the operating position, the wings are positioned such that the outer wing 201, the middle wing 203, and the inner wing 205 are approximately parallel and approximately the same height from the ground, as shown in FIGS. 5 and 6. In the operating position, the coulters are positioned such that they may engage the ground to fertilize the soil. The coulters may be lowered to engage the ground by adjusting the actuator of the toolbar system coupling mechanisms 217 such that the toolbar system is lowered.

In one illustrative example, to move the toolbar system 100 into the shipping or transport position, the middle wing 203 may be pivoted about the horizontal hinge 609 such that the middle wing 203 and outer wing 201 are tilted away from the ground and are no longer parallel to the inner wing 201, as depicted in FIG. 7. This step may also include extending the actuator of the toolbar coupling mechanism 217 such that the toolbar frame 206 is moved upwards (away from the ground) and towards the implement 300. Next, the coulters 503 on the middle wing are rotated from an operating position below the middle wing 203 to a transport or shipping position in which the coulters 503 are positioned above the middle wing 203, i.e., the coulters 503 are positioned away from the ground. Following this step, the outer wing 201 may be pivoted about hinge 407 such that it is positioned above the middle wing 203. In an embodiment of the present invention, the middle wing coulters 503 are offset relative to the outer wing 201 such that the coulters 503 do not interfere with the outer wing 201 moving into the position above the middle wing 203. In the alternative, the outer wing 201 may be pivoted about the hinge 407 to a position above the middle wing 203 first, and then the coulters 503 may be rotated to a transport or shipping position.

Next, in the illustrative example, the middle wing 203 is elevated by the elevator assembly 405. The outer wing 201 is also elevated in this step because it is coupled to the middle wing 203. The middle wing 203 may be elevated to a position above the inner wing 201. Following the elevation step, the elevator assembly 405 is rotated about a vertical axis of rotation to a folded position such that the middle wing 203 and outer wing 201 are positioned approximately orthogonal to the inner wing 201 or approximately parallel to a direction of travel. As described above, the middle wing 203 may be positioned above the carriage wheels 305 using the elevator assembly 405, the middle wing actuator 611, or a combination of both. For instance, the middle wing in FIG. 10 is positioned above the carriage wheels by both tilting and elevating it. When the middle wing 203 and outer wing 201 are rotated into this position, the toolbar system 100 is in an end user transport position. The middle wing may also be pivoted about the horizontal hinge 609 to tilt the middle wing and outer wing downward, which will reduce the overall height of the agricultural spray implement. The middle wing 203 may be tilted such that it is approximately parallel relative to the ground.

To place the toolbar system 100 into a shipping position in the illustrative example above, the coulters 503 and 501 of the middle wing 203 and outer wing 201 may be circularly rotated at their respective coupling points on the middle wing in order to decrease the width of the unit. Also, the coulter assemblies 503 and 501 may be lowered relative to their respective wing segments 203 and 201 to lower the height of the unit. The middle wing 203 may then be pivoted relative to the elevator assembly about the first horizontal axis of rotation such that it is approximately parallel to the ground and the elevator assembly 405 may lower the middle wing 203 such that the highest point of the middle wing 203, outer wing 201 and the coulters coupled to them is below the top of the implement 300. Also, the gauge wheels 221 and 223 of the middle wing and the outer wing may be removed or relocated to another position on the toolbar system 100 (e.g., a gauge wheel on the outer wing may be moved to the middle wing and vice versa) in the shipping position. In another embodiment, the toolbar system coupling mechanism 217 may be used to lower the toolbar to reduce the height.

FIGS. 32 and 33 depict an elevator assembly 805 according to an alternative embodiment of the invention. For example, the elevator assembly 805 may include an elevator 806, a shaft 808, a set of parallel arms 810, an elevator actuator 812, hinges 814 and 816, a hinge 818 coupling the middle wing and the elevator 806, and a tilt actuator 820. As shown in FIGS. 32 and 33, the elevator 806 is coupled to the shaft 808 via the set of parallel arms 810 at hinges 814 and 816. Further, one end of the actuator 812 may be coupled to the lower portion of the shaft 808 and the second end of the actuator 812 may be coupled to the top portion of the elevator 806 adjacent to hinges 816. Accordingly, as the actuator 820 extends or contracts, the set of parallel arms 810 may move up and down, which also allows the elevator 806 to move up and down with the parallel arms 810. Actuator 820 may be used to pivot the toolbar about pivot 818 between the horizontal position shown in FIGS. 32 and 33 and an upwardly tilted position (not shown). Shaft 808 may be rotatable about a vertical axis to permit folding/unfolding of the toolbar between laterally extended and retracted positions in the manner described above for the other elevator embodiment. While the number of parallel arms in the set of parallel arms 810 is shown as two, it will be understood that more than two arms, or even one arm, may be used to couple the elevator 806 to the shaft 808.

FIG. 32 shows the elevator assembly 805 in the operating (lowered) position. By way of example only, the actuator 812 is in the contracted position such that the set of parallel arms 810 slope in a downward direction toward the ground. Also, FIG. 32 depicts the hinges 816 positioned below hinges 814. Thus, as shown, the bottom portion of the elevator 806 is aligned and collinear with the bottom portion of the shaft 808 or the bottom portion of the toolbar frame 206. Moreover, in an embodiment, the tilt actuator 820 is in an extended position such that the longitudinal axis of the middle wing is also aligned and collinear with the bottom beam of the toolbar frame 206.

FIG. 33 depicts the elevator assembly 805 in an elevated position so that the toolbar system may be moved to a transport or shipping position. For instance, the actuator 812 of the elevator assembly 805 may be in an extended position such that the elevator 806 lifts up and the set of parallel arms 810 slope in an upward direction away from the ground. As depicted, the hinges 816 are now positioned above the hinges 814. Accordingly, the longitudinal axis of the middle wing is positioned above the bottom beam of the toolbar frame 206 and no longer aligned and collinear with the bottom beam. The degree of extension of the actuator 812 and/or the position of the hinges 814 may determine how high the elevator 808 is elevated. Once the elevator 808 is elevated to a particular height, the elevator assembly 805 may pivot about a vertical axis of rotation relative to the toolbar frame 206, in a manner similar to that described above.

An advantage of the invention is that by lifting and folding the toolbar, the overall width of the agricultural spray implement may be reduced. Narrower road transport width may be beneficial to the operators by making it safer and more convenient to transport the spray implement on the roads. Further, when the toolbar is lowered in the folded position and all the tools coupled to the wings are pushed down, the height and width of the spray implement may be reduced, thereby reducing the overall shipping height and width of the implement. It may also beneficial to dealers as they have minimum labor and time in setting up the toolbar system once delivered. Moreover, adapting the one or more tools coupled to the middle wing to be rotatable relative to the middle wing to a transport/shipping position above the middle wing may make it safer and more convenient for the operators to move the toolbar into the transport/shipping position, as opposed to rotating the entire middle wing to reposition the tools.

It will also be appreciated that the above example components and operations are illustrative only, and that an embodiment of the present application may have fewer or more components or operations than those illustrated above, and have operations arranged in an order different than that illustrated above. For example, the above system may be used with an implement with tracks rather than wheels, and the focus on reducing the height and width of the unit in the end user transport position and the shipping position will still apply. These and other modifications and changes apparent to those of skill in the art are intended to be encompassed by the following claims.

The invention claimed is:

1. An agricultural implement comprising:
   a frame having a longitudinal axis and laterally opposed sides;
   at least one wheel on each side of the frame;
   a hitch coupled to the frame and adapted for connection to a tow vehicle;
   a tank coupled to the frame and adapted to hold a liquid to be sprayed;
   a toolbar system coupled to the frame, wherein the toolbar system includes:
      a toolbar frame having a longitudinal axis extending substantially transverse to the longitudinal axis of the frame;
      a first actuator securing the toolbar frame to the frame such that the first actuator is configured to move the toolbar frame vertically relative to a ground surface;
      an elevator assembly coupled to the toolbar frame and including a shaft and an elevator, the elevator coupled to the shaft such that the elevator is pivotable about a first axis of rotation extending through the shaft;
      a first wing disposed on one side of the frame, and the first wing having an inner portion coupled to the elevator, an outer portion, and a longitudinal axis extending through the inner portion and the outer portion, and the first wing being pivotable about the first axis of rotation with the elevator between an extended position wherein the first wing extends laterally outward from the toolbar frame and a folded position wherein the longitudinal axis of the first wing is oriented substantially transverse to the longitudinal axis of the toolbar frame;
      a plurality of first wing members coupled to the first wing;
      one or more tools coupled to at least one of the plurality of first wing members, and
      a second actuator coupled to the toolbar frame and configured to move the elevator between a first height and a second height;
      wherein the first wing is position higher than the wheel on the same side of the frame when the elevator is set at the second height and the first wing is in the folded position;

wherein the at least one of the plurality of first wing members is adapted to be rotated relative to the first wing from an operating position below the first wing to a transport/shipping position above the first wing.

2. The implement of claim 1, wherein the first wing is pivotable about a first substantially horizontal axis of rotation that is so as to tilt the first wing at a first angle relative to a horizontal plane, the first substantially horizontal axis of rotation being substantially parallel to the longitudinal axis of the frame in the operating position.

3. The implement of claim 2, wherein the first angle away from the approximately horizontal plane is such that the first wing is positioned higher than the wheel on the same side of the frame along an entire length of the wheel in the folded position.

4. The implement of claim 2, wherein the first angle and the second height of the elevator, in combination, are such that the first wing is positioned higher than the wheel on the same side of the frame along an entire length of the wheel in the folded position.

5. The implement of claim 2, wherein the first substantially horizontal axis of rotation is adjacent to the first axis of rotation and the first substantially horizontal axis is moveable between the first height and the second height.

6. The implement of claim 1, further comprising a second wing having an inner portion pivotably coupled to the outer portion of the first wing to pivot about a second axis of rotation in the operating position between an extended position projecting laterally outward from the first wing and a folded position overlapping the first wing.

7. The implement of claim 6, further comprising a third wing coupled to the toolbar frame.

8. The implement of claim 7, further comprising one or more tools coupled to at least one of the second wing and the third wing.

9. The implement of claim 8, wherein the one or more tools coupled to the first wing, the second wing, and the third wing are at least one of a coulter, a knife, a spike, a tine, and a ripper point.

10. The implement of claim 8, wherein the one or more tools are adapted to be circularly rotatable about respective points of coupling on the first wing and second wing.

11. The implement of claim 10, wherein the one or more tools are configured to be oriented substantially vertically upward when in the transport/shipping position.

12. The implement of claim 10, wherein the one or more tools are configured to fit substantially within a profile of the toolbar frame and the at least one wheel on each side of the frame when in the transport/shipping position.

13. The implement of claim 1, wherein the one or more tools coupled to the first wing is adapted to be circularly rotatable about respective points of coupling on the first wing.

14. The implement of claim 13, wherein the transport/shipping position is such that the longitudinal axis of the first wing is approximately parallel to the same side of the implement and the one or more tools are rotated so as to be approximately parallel to the same side of the agricultural implement.

15. The implement of claim 1, wherein when the at least one of the plurality of first wing members is rotated to the transport/shipping position above the first wing, the at least one of the plurality of first wing members is configured to be oriented substantially vertically upward.

16. The implement of claim 1, wherein when the at least one of the plurality of first wing members is rotated to the transport/shipping position above the first wing, the at least one of the plurality of first wing members is configured to fit substantially within a profile of the toolbar frame and the at least one wheel on each side of the frame.

17. The implement of claim 1, wherein the elevator assembly includes one or more arms extending from the shaft to the elevator, and at least one of the elevator and the shaft includes hinges pivotably coupled to the one or more arms such that the elevator is movable relative to the shaft between a first height and a second height.

18. The implement of claim 17, wherein the second actuator comprises a first end coupled to the toolbar frame adjacent a lower end of the shaft and a second end coupled to a top portion of the elevator adjacent to one of the hinges, and wherein the second actuator is configured to extend and retract to move the elevator between the first height and the second height.

19. A toolbar system for an agricultural implement that includes a frame having a longitudinal axis and laterally opposed sides, at least one wheel on each side of the frame, the toolbar system comprising:
   a toolbar frame;
   a first actuator configured to move an entire length of the toolbar frame vertically relative to a ground surface;
   an elevator assembly coupled to the toolbar frame and including a shaft and an elevator, the elevator coupled to the shaft such that the elevator pivots about a first axis of rotation extending through the shaft;
   a first wing disposed on one side of the toolbar frame, and the first wing having an inner portion coupled to the elevator and an outer portion, and the first wing being pivotable about the first axis of rotation between an extended position wherein the first wing extends laterally outward from the toolbar frame and a folded position wherein the first wing is oriented approximately perpendicular to the toolbar frame;
   a plurality of first wing members coupled to the first wing; and
   one or more tools coupled to at least one of the plurality of first wing members,
   a second actuator coupled to the toolbar frame;
   wherein the second actuator is configured to move the elevator between a first height and a second height such that the first wing is position higher than the wheel on the same side of the frame in the folded position;
   wherein the at least one of the plurality of first wing members is adapted to be rotated relative to the toolbar frame from an operating position below the toolbar frame to a transport/shipping position above the toolbar frame, and
   wherein when the at least one of the plurality of first wing members is rotated to the transport/shipping position above the first wing, the at least one of the plurality of first wing members is configured to be oriented substantially vertically upward.

20. The toolbar system of claim 19, wherein when the at least one of the plurality of first wing members is rotated to the transport/shipping position above the first wing, the at least one of the plurality of first wing members is configured to fit substantially within a profile of the toolbar frame and the at least one wheel on each side of the frame.

21. An agricultural implement comprising:
   a frame defining a longitudinal axis and comprising laterally opposed sides;
   at least one wheel or track on each side of the frame;
   a hitch coupled to the frame and configured to connect to a tow vehicle;

a tank coupled to the frame and configured to hold a liquid to be sprayed;
a toolbar system coupled to the frame, wherein the toolbar system includes:
a toolbar frame comprising an inner wing;
a first actuator securing the toolbar frame to the frame, wherein the first actuator is configured to move the toolbar frame vertically relative to a ground surface;
a first hinge coupled to the inner wing and comprising a first shaft;
a middle wing disposed proximately to an end of the inner wing, wherein the middle wing comprises an inner portion coupled to the first hinge and an outer portion, and the middle wing defines a longitudinal axis extending through the inner portion and outer portion, and the middle wing is configured to pivot about a first axis of rotation extending transverse to the inner wing between an extended position where the middle wing extends laterally outward from the toolbar frame and a folded position where the longitudinal axis of the middle wing is oriented substantially transverse to the inner wing;
a plurality of middle wing members coupled to the middle wing;
one or more tools coupled to at least one of the plurality of middle wing members; and
a second actuator coupled to the inner wing and configured to move the first hinge between a first height and a second height;
wherein the middle wing is position higher than the wheel or track on the same side of the frame when the first hinge is set at the second height and the middle wing is in the folded position,
wherein the one or more tools coupled to the middle wing is configured to be circularly rotatable about respective points of coupling on the middle wing,
wherein the folding position is such that the longitudinal axis of the middle wing is approximately parallel to the same side of the implement and the one or more tools are rotated so as to be approximately parallel to the same side of the agricultural implement.

22. The implement of claim 21, further comprising an outer wing having an inner portion pivotably coupled to the outer portion of the middle wing to pivot about a second axis of rotation in the operating position between an extended position projecting laterally outward from the middle wing and a folded position overlapping the middle wing.

23. The implement of claim 22, further comprising one or more tools coupled to at least one of the inner wing and the outer wing.

24. The implement of claim 23, wherein the one or more tools coupled to the inner wing, the middle wing, and the outer wing are at least one of a coulter, a knife, a spike, a tine, and a ripper point.

25. The implement of claim 21, wherein the one or more tools are rotated so as to be positioned above the wheel or track on the same side of the frame when the middle wing is set in the folding position.

* * * * *

UNITED STATES PATENT AND TRADEMARK OFFICE
CERTIFICATE OF CORRECTION

| | |
|---|---|
| PATENT NO. | : 10,531,604 B2 |
| APPLICATION NO. | : 15/809495 |
| DATED | : January 14, 2020 |
| INVENTOR(S) | : Michael D. Van Mill et al. |

Page 1 of 1

It is certified that error appears in the above-identified patent and that said Letters Patent is hereby corrected as shown below:

In the Specification

Column 10, Line 12: delete "201" and insert --205--.

Column 10, Line 35: delete "inner wing 201" and insert --inner wing 205--.

Column 10, Line 39: delete "inner wing 201" and insert --inner wing 205--.

Signed and Sealed this
Seventh Day of October, 2025

John A. Squires
*Director of the United States Patent and Trademark Office*